US007934482B2

(12) United States Patent
Messmer

(10) Patent No.: US 7,934,482 B2
(45) Date of Patent: May 3, 2011

(54) LIQUID-COOLED COMPOSITE PISTON

(75) Inventor: Dieter Messmer, Remseck (DE)

(73) Assignee: MAHLE International GmbH, Stuttgart (DE)

( * ) Notice: Subject to any disclaimer, the term of this patent is extended or adjusted under 35 U.S.C. 154(b) by 572 days.

(21) Appl. No.: 11/991,522

(22) PCT Filed: Sep. 2, 2006

(86) PCT No.: PCT/DE2006/001548

§ 371 (c)(1), (2), (4) Date: Jun. 17, 2008

(87) PCT Pub. No.: WO2007/028364

PCT Pub. Date: Mar. 15, 2007

(65) Prior Publication Data

US 2009/0139481 A1 Jun. 4, 2009

(30) Foreign Application Priority Data

Sep. 5, 2005 (DE) ......................... 10 2005 042 003

(51) Int. Cl.
*F16J 1/00* (2006.01)

(52) U.S. Cl. ...................... 123/193.6; 123/41.35; 92/220

(58) Field of Classification Search ............... 123/193.6, 123/41.35, 41.16; 92/208, 216, 217, 220
See application file for complete search history.

(56) References Cited

U.S. PATENT DOCUMENTS 3,358,657 A 12/1967 Herrmann
3,465,651 A 9/1969 Tromel
4,375,782 A * 3/1983 Schieber ......................... 92/176
5,081,968 A * 1/1992 Bruni ......................... 123/193.6
6,729,291 B1 5/2004 Scharp et al.
2008/0121204 A1* 5/2008 Scharp ....................... 123/193.6
2009/0260593 A1* 10/2009 Messmer .................. 123/193.6

FOREIGN PATENT DOCUMENTS

DE 14 76 111 10/1970
DE 29 36 630 3/1981
DE 41 31 275 3/1993
DE 102 57 022 6/2004
EP 0 604 223 6/1994
FR 1 037 133 9/1953

OTHER PUBLICATIONS

International Search Report.

* cited by examiner

*Primary Examiner* — M. McMahon
(74) *Attorney, Agent, or Firm* — Collard & Roe, P.C.

(57) ABSTRACT

The invention proposes a liquid-cooled assembled piston (1) having an upper part (2) and a lower part (3), wherein the upper part (2) and the lower part (3) are connected to one another by means of a radially outer annular support (12) and by means of a radially inner annular support (11). An outer cooling duct (13) is arranged between the outer support (12) and the inner support (11), and an inner cooling duct (18) is arranged radially within the inner support (11). Here, the outer cooling duct (13) is connected to the inner cooling duct (18) by means of at least one overflow duct (22, 22').

1 Claim, 2 Drawing Sheets

LIQUID-COOLED COMPOSITE PISTON

CROSS REFERENCE TO RELATED APPLICATIONS

Applicant claims priority under 35 U.S.C. §119 of German Application No. 10 2005 042 003.6 filed Sep. 5, 2005. Applicant also claims priority under 35 U.S.C. §365 of PCT/DE2006/001548 filed Sep. 2, 2006. The international application under PCT article 21(2) was not published in English.

The invention relates to a liquid-cooled composite piston in accordance with the preamble of the claim.

A liquid-cooled composite piston that consists of an upper part forming the piston head and a lower part having the piston skirt is known from the Offenlegungsschrift [examined patent application published for public scrutiny] DE 41 31 275 A1. The upper part and the lower part are connected with one another by means of an expansion screw, whereby a sleeve is disposed between the head of the expansion screw and a collar of the lower part that serves to support the expansion screw, which sleeve has radial bores by way of which cooling oil that has collected in an inner cooling chamber can drain off.

It is a disadvantage, in this connection, for one thing, that the expansion screw requires a relatively large amount of space, which prevents a reduction in the compression height and thus a reduction in the axial dimensions of the piston. For another thing, unhindered draining of cooling oil out of the inner cooling chamber requires an additional sleeve having radial bores, which makes the assembly of the piston known from the state of the art rather complicated.

It is the task of the invention to avoid these disadvantages of the state of the art.

This task is accomplished with the characteristics standing in the characterizing part of the claim.

The invention will be described below, using the drawings. These show

Figure 1:
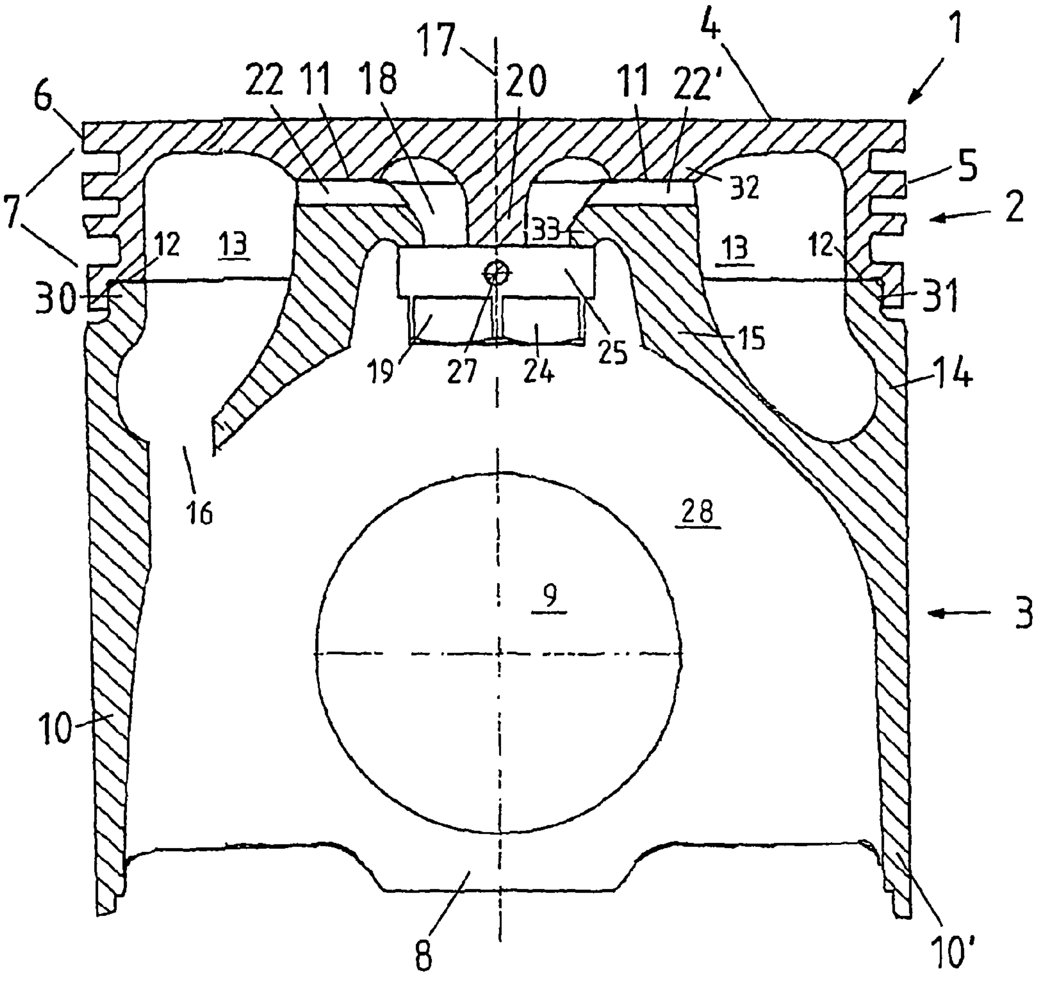
Figure 2:
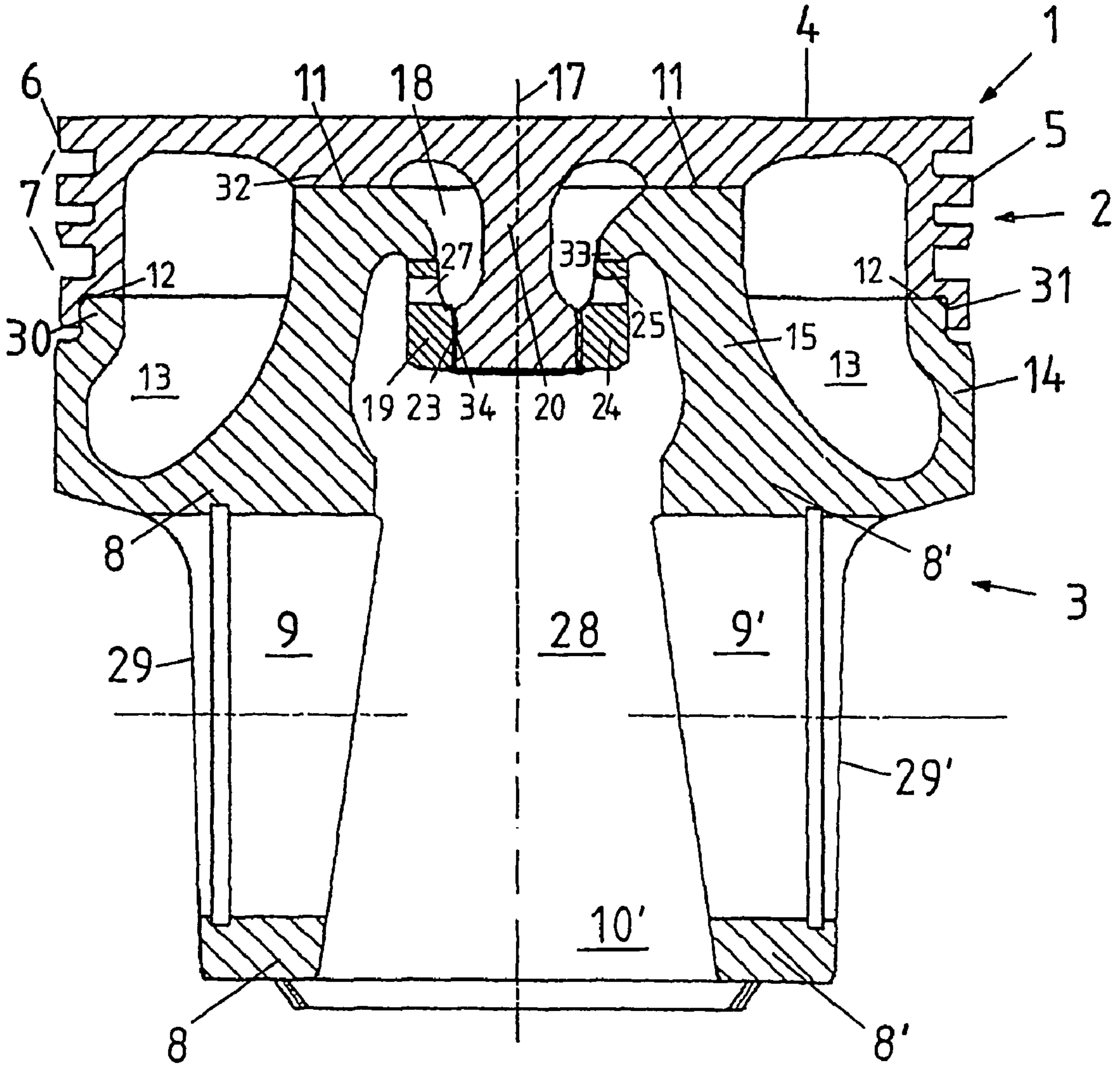

FIG. 1 a section through a liquid-cooled composite piston, along a plane that lies in the major thrust side/minor thrust side direction of the piston, with a side view of the hexagonal nut according to the invention, FIG. 2 a section through the piston along a plane that lies in the direction of the longitudinal axis of the pin bore, with a section through the hexagonal nut according to the invention.

A two-part, liquid-cooled composite piston 1 is shown in FIGS. 1 and 2, which piston consists of an upper part 2 and a lower part 3. The upper part 2 and the lower part 3 can be produced from aluminum, steel, or from cast iron with spheroidal graphite (GGG cast iron according to DIN 1693). A piston crown 4 delimits the axial top of the upper part 2. A ring wall 5 is formed onto the outer edge of the piston crown 4, the outer surface of which wall forms a top land 6 on the piston crown side, which is followed, on the skirt side, by a ring belt 7 having ring grooves for accommodating piston rings not shown in the figures.

Two pin bosses 8, 8' each having a pin bore 9, 9' are disposed on the underside of the lower part 3 that faces away from piston crown 4. In this connection, the radially outer face surfaces 29, 29' of the pin bosses 8, 8' are offset radially inward with regard to the ring wall 5. The pin bosses 8, 8' are connected with one another by way of skirt elements 10, 10'.

The upper part 2 and the lower part 3 of the piston 1 are connected with one another by way of a radially inner, ring-shaped contact surface 11 and by way of a radially outer, ring-shaped contact surface 12, disposed concentric to the former. The radially outer contact surface 12 is formed by the piston-crown-side face surface of a support land 14 that runs radially on the outside, and is formed on, on the piston crown side, partially onto the skirt elements 10, 10' (FIG. 1) and partly onto the pin bosses 8, 8' (FIG. 2). In cross-section, the contact surface 12 has the shape of a step 30 directed radially inward and axially in the direction of the piston crown 4.

During assembly of the piston 1, its upper part 2 and its lower part 3 can be aligned coaxially with one another in that the inner side of the lower face of the ring wall 5 has a cylindrical recess 31, the inside shape of which is complementary to the shape of the step 30 of the outer contact surface 12, so that during assembly of the piston 1, the step 30 can be introduced into the recess 31, thereby achieving coaxial alignment of the upper part and lower part of the piston 1.

The inner contact surface 11 is formed by the ring-shaped, piston-crown-side face of a lower part foot 15 that runs on the circumference radially within the support land 14, and, like the support land 14, is formed on, partly onto the skirt elements 10, 10' (FIG. 1) and partly onto the pin bosses 8, 8' (FIG. 2). The upper part 2 of the piston 1 rests on the inner contact surface 11 by way of a formed-on part 32 disposed on the side of the piston facing away from the piston crown, whereby the face of the formed-on part 32 that faces away from the piston crown rests on the inner contact surface 11, and at least approximately has the same radial diameter as the inner contact surface 11.

An outer cooling channel 13 disposed in the piston-crown-side edge region of the piston 1 is formed by the upper part 2 and by the lower part 3 of the piston 1, the radially outer delimitation of which channel is formed partly by the ring wall 5 and partly by the support land 14, the radially inner delimitation by the lower part foot 15, the axially upper delimitation by the piston crown 4, and the axially lower delimitation by the lower part 3 of the piston 1. Cooling oil is passed into the outer cooling channel 13 by way of at least one oil feed channel 16 that opens into the piston interior 28.

The piston 1 has another ring-shaped inner cooling channel 18, disposed coaxial to the piston axis 17, which has a lesser radial diameter than the outer cooling channel 13, and is disposed within the outer cooling channel 13, seen in the radial direction. Axially at the top, the inner cooling channel 18 is delimited by the piston crown 4, radially on the outside partly by the lower part foot 15 and partly by a formed-on part 33 that narrows conically in the direction facing away from the piston crown, disposed radially on the inside of the lower part foot 15, axially at the bottom by a hexagonal nut 19 that will be explained in greater detail below, and radially on the inside by a pin 20 configured cylindrically, which is disposed on the underside of the piston crown 4, coaxial to the piston axis 17. The outer cooling channel 13 is connected with the inner cooling channel 18 by way of groove-shaped overflow channels 22, 22' worked into the inner contact surface 11. The outer cooling channel 13 and the inner cooling channel 18 can also be connected with one another by way of bores made in the lower part foot 15.

The mantle surface of the pin 20 has an end region facing away from the piston crown, having an outside thread 23 (FIG. 2), which corresponds to the inside thread 34 of the hexagonal nut 19, so that the hexagonal nut 19 can be screwed onto the outside thread 23 of the pin 20.

In this connection, the hexagonal nut 19 consists of a threaded part 24 having the inside thread 34 and an outer surface that is hexagonal, seen in the radially horizontal cross-section, and a collar 25 formed onto it on the piston crown side, which, in the present exemplary embodiment, has two radially disposed bores or millings 26, 27 that lie opposite one another, which connect the inner cooling channel 18 with the piston interior 28. Once the hexagonal nut 19 has been screwed tight, the piston-crown-side face of the collar 25 lies against the face of the formed-on part 33 that faces away from the piston crown side.

Proceeding from the piston interior 28, this results in a continuous oil channel by way of the oil feed channel 16, the outer cooling channel 13, the overflow channels 22, 22', the inner cooling channel 18, and the bores (millings) 26 and 27 in the collar 25 of the hexagonal nut 19, back to the piston interior 28.

REFERENCE SYMBOL LIST

1 piston
2 upper part of the piston 1
3 lower part of the piston 1
4 piston crown
5 ring wall
6 top land
7 ring belt
8, 8' pin boss
9, 9' pin bore
10, 10' skirt element
11 inner contact surface
12 outer contact surface
13 outer cooling channel
14 support land
15 lower part foot
16 oil feed channel
17 piston axis
18 inner cooling channel
19 hexagonal nut
20 pin
22, 22' overflow channel
23 outside thread of the pin 20
24 threaded part of the hexagonal nut 19
25 collar of the hexagonal nut
26, 27 bore (milling) in the collar 25 of the hexagonal nut 19
28 piston interior
29, 29' face surfaces of the pin bosses 8, 8'
30 step of the outer contact surface 12
31 recess in the face of the ring wall 5
32, 33 formed-on part
34 inside thread of the hexagonal nut

The invention claimed is:

1. Liquid-cooled composite piston (1)

having an upper part (2) that has a piston crown (4) and a ring wall (5) having a top land (6) and having a ring belt (7), and having a lower part (3) that has pin bosses (8, 8') having pin bores (9, 9') and skirt elements (10, 10'), whereby the upper part (2) and the lower part (3) stand in connection with one another by way of a radially outer ring-shaped contact surface (12) and by way of a radially inner ring-shaped contact surface (11), whereby an outer cooling channel (13) is disposed between the outer contact surface (12) and the inner contact surface (11), and an inner cooling channel (18) is disposed radially within the inner contact surface (11), whereby the piston interior (28) is connected with the outer cooling channel (13) by way of at least one oil feed channel (16), and the outer cooling channel (13) is connected with the inner cooling channel (18) by way of at least one overflow channel (22, 22'), wherein a pin (20) having an outside thread (23) is disposed on the underside of the piston crown (4), facing away from the piston crown, coaxial to the piston axis (17), the upper part (2) and the lower part (3) of the piston (1) are screwed together by means of a hexagonal nut (19) that can be screwed onto the outside thread (23) of the pin (20), and the hexagonal nut (19) has a collar (25) on the piston crown side, having at least one radially disposed bore or milling (26, 27), which connects the inner cooling channel (18) with the piston interior (28).

* * * * *